United States Patent
Hong et al.

(10) Patent No.: US 11,521,801 B2
(45) Date of Patent: Dec. 6, 2022

(54) SOLID ELECTROLYTE CAPACITOR AND FABRICATION METHOD THEREOF

(71) Applicant: SAMSUNG ELECTRO-MECHANICS CO., LTD., Suwon-si (KR)

(72) Inventors: Jin Ho Hong, Suwon-si (KR); Youn Soo Kim, Suwon-si (KR); Oh Choon Kwon, Suwon-si (KR); Hyun Sub Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 16/877,913

(22) Filed: May 19, 2020

(65) Prior Publication Data

US 2021/0166886 A1 Jun. 3, 2021

(30) Foreign Application Priority Data

Nov. 28, 2019 (KR) .................. 10-2019-0155228

(51) Int. Cl.
| | | |
|---|---|---|
| H01G 9/15 | (2006.01) | |
| H01G 9/052 | (2006.01) | |
| H01G 9/00 | (2006.01) | |
| H01G 11/36 | (2013.01) | |
| H01G 11/46 | (2013.01) | |
| H01G 11/48 | (2013.01) | |
| H01G 9/04 | (2006.01) | |

(52) U.S. Cl.
CPC ......... *H01G 9/0525* (2013.01); *H01G 9/0036* (2013.01); *H01G 9/15* (2013.01); *H01G 11/36* (2013.01); *H01G 11/46* (2013.01); *H01G 11/48* (2013.01); *H01G 2009/05* (2013.01)

(58) Field of Classification Search
None
See application file for complete search history.

(56) References Cited

U.S. PATENT DOCUMENTS

| | | | | |
|---|---|---|---|---|
| 6,128,180 | A * | 10/2000 | Araki | ........... H01G 9/15 361/525 |
| 6,430,032 | B2 * | 8/2002 | Sakai | ........... H01G 9/15 361/523 |
| 9,318,268 | B2 * | 4/2016 | Onoue | ........... H01G 9/0036 |

(Continued)

FOREIGN PATENT DOCUMENTS

| | | | | |
|---|---|---|---|---|
| CN | 1422432 A | * | 6/2003 | ........... H01G 9/025 |
| JP | 2001-185456 A | | 7/2001 | |

(Continued)

OTHER PUBLICATIONS

Machine translation of JP 200388052 (Year: 2003).*
Machine translation of JP 2008192886 (Year: 2008).*

*Primary Examiner* — Dion R. Ferguson
(74) *Attorney, Agent, or Firm* — Morgan, Lewis & Bockius LLP

(57) ABSTRACT

A solid electrolyte capacitor includes a sintered body formed by sintering a molded body containing metal powder; and a conductive polymer layer disposed above the sintered body. A ratio (t2/t1) of a thickness (t2) of the conductive polymer layer in an edge portion of the sintered body to a thickness (t1) of the conductive polymer layer in a central portion of the sintered body satisfies $0.35 \leq t2/t1 \leq 0.9$.

16 Claims, 3 Drawing Sheets

(56) References Cited

U.S. PATENT DOCUMENTS

2010/0157510 A1\* 6/2010 Miyachi .................. H01G 9/15
977/932
2021/0166886 A1\* 6/2021 Hong .................. H01G 9/0036

FOREIGN PATENT DOCUMENTS

| JP | 2003188052 A | \* | 7/2003 | ............. H01G 9/028 |
| JP | 2008192886 A | \* | 8/2008 | ............. H01G 11/56 |
| JP | 2010192831 A | \* | 9/2010 | ............. H01G 11/48 |
| JP | 2017-022221 A | | 1/2017 | |
| KR | 10-2012-0051986 A | | 5/2012 | |
| WO | WO-2020195491 A1 | \* | 10/2020 | ............... H01G 9/00 |

\* cited by examiner

SOLID ELECTROLYTE CAPACITOR AND FABRICATION METHOD THEREOF

CROSS-REFERENCE TO RELATED APPLICATION

This application claims the benefit of priority to Korean Patent Application No. 10-2019-0155228 filed on Nov. 28, 2019, with the Korean Intellectual Property Office, the disclosure of which is incorporated herein by reference.

BACKGROUND

The present disclosure relates to a solid electrolyte capacitor and a fabrication method thereof, and relates to a solid electrolyte capacitor having excellent reliability and a fabrication method thereof.

A tantalum (Ta) material is a metal that is widely used throughout a range of fields in various industries such as the electrical, electronic, mechanical, chemical, aerospace, and defense industries, due to having mechanical and physical characteristics such as a high melting point, excellent ductility and excellent corrosion-resistance, or the like.

In particular, since the tantalum material may form the most stable anodic oxide film, tantalum has been widely used as a material in forming anodes for small capacitors.

Moreover, due to the rapid development of the IT industry, such as electronics and information and communication, the use of tantalum materials is increasing rapidly every year by 10%.

A tantalum capacitor has a structure that uses a gap that appears when the tantalum powder is sintered and hardened, and forms tantalum oxide ($Ta_2O_5$) on a surface of the tantalum as an electrode metal by an anodic oxidation method, and uses it as a dielectric to form a manganese dioxide ($MnO_2$) layer or a conductive polymer layer thereon as a solid electrolyte.

In addition, due to the derivation of a cathode electrode, a silver (Ag) layer is formed as a carbon layer and a metal layer on the manganese dioxide ($MnO_2$) layer or the conductive polymer layer.

The tantalum capacitor is characterized by having low equivalent series resistance (ESR) and high ripple current rating.

Due thereto, the tantalum capacitor can have much better temperature dependence and long service life than an aluminum electrolyte capacitor.

However, the tantalum capacitor has had a problem in that reliability may be deteriorated due to a thickness of a non-uniform film when a polymer is applied above a sintered body.

Therefore, in order to realize a high-reliability tantalum capacitor, there is a need for a study capable of forming a uniform film when applying a polymer above the sintered body.

SUMMARY

An aspect of the present disclosure relates to a solid electrolyte capacitor and a fabrication method thereof, and relates to a solid electrolyte capacitor having excellent reliability and a fabrication method thereof.

According to an aspect of the present disclosure, a solid electrolyte capacitor includes: a sintered body formed by sintering a molded body containing metal powder; and a conductive polymer layer disposed above the sintered body, wherein a ratio (t2/t1) of a thickness (t2) of the conductive polymer layer in an edge portion of the sintered body to a thickness (t1) of the conductive polymer layer in a central portion of the sintered body satisfies $0.35 \leq t2/t1 \leq 0.9$.

According to another aspect of the present disclosure, a fabrication method of a solid electrolyte capacitor includes operations of: forming a sintered body by sintering; and forming a conductive polymer layer above the sintered body, wherein a ratio (t2/t1) of a thickness (t2) of the conductive polymer layer in an edge portion of the sintered body to a thickness (t1) of the conductive polymer layer in a central portion of the sintered body satisfies $0.35 \leq t2/t1 \leq 0.9$.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
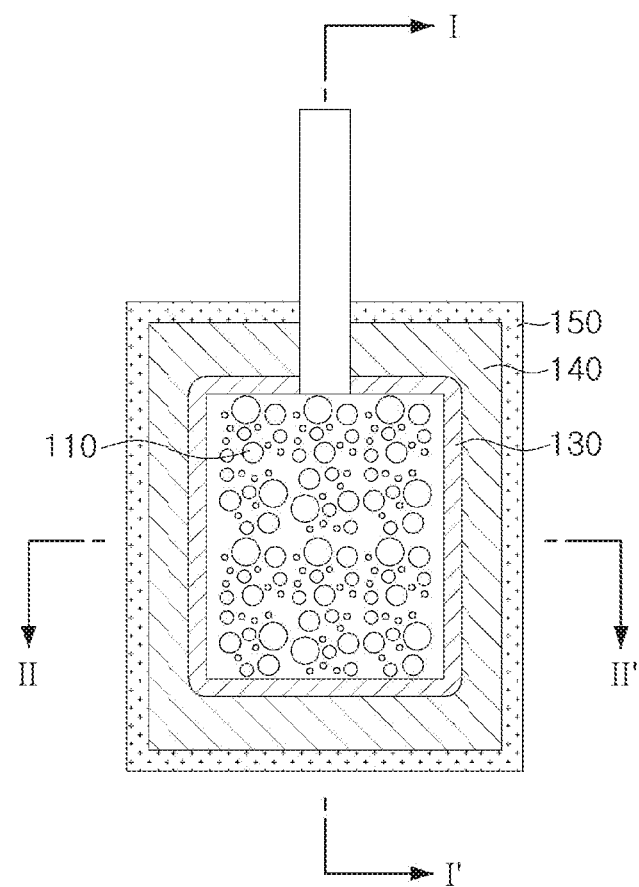
FIG. 1 is a cross-sectional view of a sintered body of a solid electrolyte capacitor according to an embodiment of the present disclosure.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are same elements in the drawings.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

Hereinafter, embodiments of the present disclosure will be described as follows with reference to the attached drawings.

FIG. 1 is a cross-sectional view of a sintered body of a solid electrolyte capacitor according to an embodiment of the present disclosure.

Figure 2:
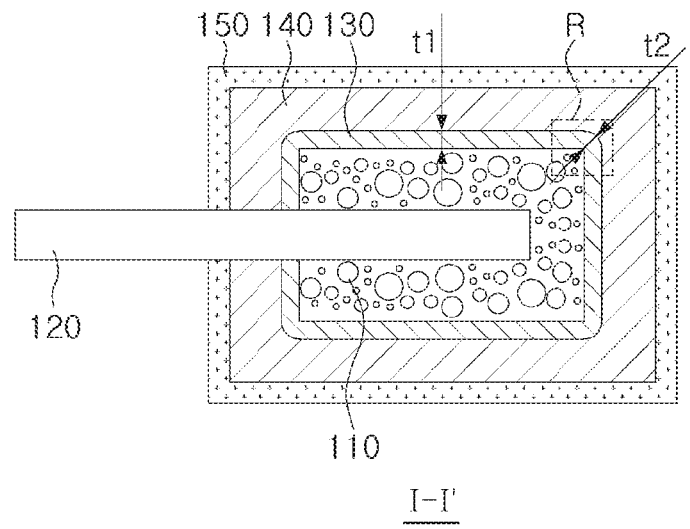
FIG. 2 is a cross-sectional view taken along line I-I' in FIG. 1.

FIG. 2 is a cross-sectional view taken along line I-I' in FIG. 1.

Figure 3:
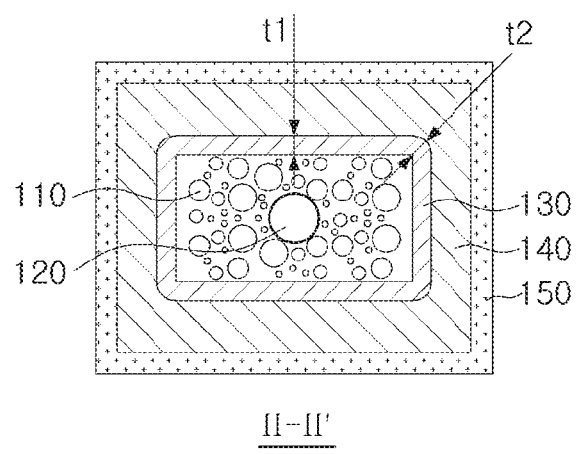
FIG. 3 is a cross-sectional view taken along line II-II' of FIG. 1.

FIG. 3 is a cross-sectional view taken along line I-I' in FIG. 1.

Figure 4:
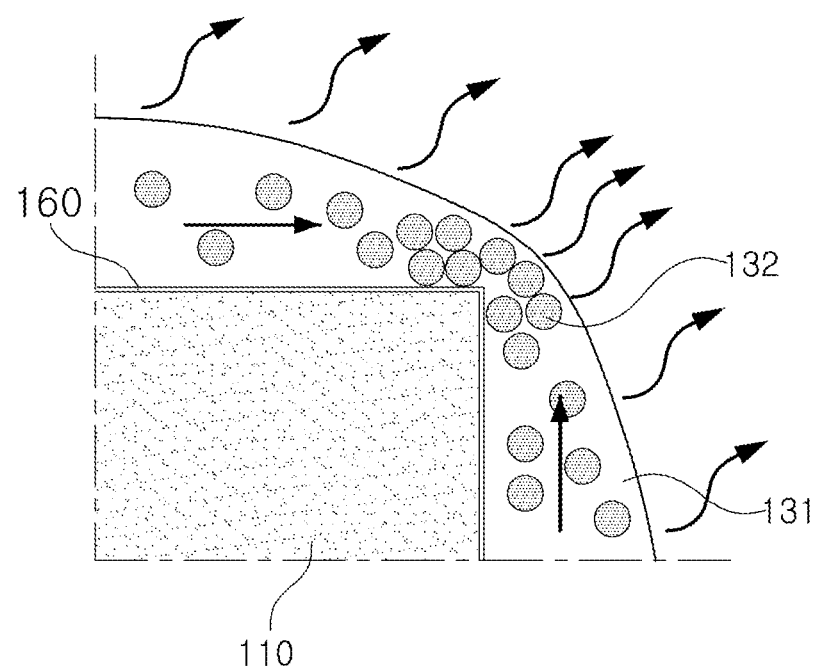
FIG. 4 is a cross-sectional view, corresponding to region R in FIG. 2, showing a process to form a conductive polymer layer on a sintered body according to an embodiment of the present disclosure.

FIG. 4 is a cross-sectional view, corresponding to region R in FIG. 2, showing a process to form a conductive polymer layer on a sintered body according to an embodiment of the present disclosure.

Referring to FIGS. 1 to 3, a solid electrolytic capacitor according to an embodiment of the present disclosure includes a sintered body 110 formed by sintering a molded body containing metal powder, and a conductive polymer layer 130 disposed above the sintered body 110. A ratio (t2/t1) of a thickness (t2) of the conductive polymer layer 130 in an edge portion of the sintered body 110 to a thickness (t1) of the conductive polymer layer 130 in a central portion of the sintered body 110 satisfies $0.35 \leq t2/t1 \leq 0.9$.

The solid electrolyte capacitor may further include an anode wire 120 having an insertion region located inside the sintered body 110 and a non-insertion region located outside of the sintered body 110.

The sintered body 110 may be formed by sintering a molded body including metal powder and a binder.

Specifically, metal powder, a binder, and a solvent may be mixed and stirred at a predetermined ratio, and the mixed powder may be compressed into a rectangular parallelepiped form, and then it may be sintered under high temperature and high vibration.

The metal powder is not particularly limited as long as it can be used in the sintered body of the solid electrolyte capacitor according to an embodiment of the present disclosure, for example, may be one or more selected from a group consisting of tantalum (Ta), aluminum (Al), niobium (Nb), vanadium (V), titanium (Ti), and zirconium (Zr).

In particular, the sintered body of the solid electrolyte capacitor according to an embodiment of the present disclosure may be formed using tantalum (Ta) powder.

The binder is not particularly limited, and may be, for example, a cellulose-based binder.

The cellulose-based binder may be one or more selected from a group consisting of nitrocellulose, methyl cellulose, ethyl cellulose, and hydroxy propyl cellulose.

In addition, the anode wire 120 may be inserted into and mounted thereon to be offset from the center before compressing the mixed powder.

According to an embodiment of the present disclosure, a dielectric oxide layer 160 may be formed on the sintered body 110 as an insulating layer (see FIG. 4).

That is, the dielectric oxide layer may be formed by growing an oxide film ($Ta_2O_5$) on the surface of the sintered body 110 by a chemical treatment process using an electrochemical reaction.

In this case, the dielectric oxide layer changes the sintered body 110 into a dielectric.

In addition, a conductive polymer layer 130 having a polarity of a cathode may be formed on the dielectric oxide layer.

The conductive polymer layer 130 is not particularly limited, and may be formed of, for example, a conductive polymer.

In the case of a conductive polymer, a cathode layer having a conductive polymer cathode may be formed on an outer surface of the sintered body 110 formed with an insulating layer using a method of chemical polymerization or electrolytic polymerization using EDOT (3,4-ethylenedioxythiophene) or a pyrrole monomer.

That is, the conductive polymer layer 130 may include polypyrrole or EDOT (3,4-ethylenedioxythiophene).

In general, a tantalum capacitor is characterized by having low equivalent series resistance (ESR) and a high ripple current rating.

Due thereto, a tantalum capacitor can have much better temperature dependence and long service life than an aluminum electrolyte capacitor.

However, the tantalum capacitor has had a problem in that reliability is deteriorated due to a thickness of a non-uniform film when a polymer is applied above the sintered body.

Therefore, in order to realize a high-reliability tantalum capacitor, there is a need for a study capable of forming a uniform film when applying a polymer above the sintered body.

According to an embodiment of the present disclosure, a ratio (t2/t1) of a thickness (t2) of the conductive polymer layer 130 in an edge portion of the sintered body 110, as compared to a thickness (t1) of the conductive polymer layer 130 in a central portion of the sintered body 110, satisfies $0.35 \leq t2/t1 \leq 0.9$. As a non-limiting example, the thickness (t1) of the conductive polymer layer 130 in a central portion of the sintered body 110 may refer to a thickness of a portion of the conductive polymer layer 130 between two edge portions (or corner portions) of the conductive polymer layer 130. As a non-limiting example, the thickness (t1) of the conductive polymer layer 130 in a central portion of the sintered body 110 may refer to a thickness of a central portion of the conductive polymer layer 130 between two edge portions (or corner portions) of the conductive polymer layer 130. As a non-limiting example, the thickness (t2) of the conductive polymer layer 130 may refer to a dimension of the conductive polymer layer 130 in a diagonal direction of the sintered body 110 in a cross-section view, or a dimension of the conductive polymer layer 130 in a direction from the edge portion to a center of the sintered body 110. In one example, an edge portion of the conductive polymer layer 130 may refer to a portion of the conductive polymer layer 130 covering a corner of the sintered body 110 where two outer surfaces of the sintered body 110 meet each other. A diagonal direction of the sintered body 110 may refer to a direction from one corner of the sintered body 110 where two outer surfaces of the sintered body 110 meet each other to another corner of the sintered body 110 where another two outer surfaces of the sintered body 110 meet each other. A cross-section view may be a plane parallel or substantially parallel to an outer surface of the sintered body 110 or an outer surface of the solid electrolytic capacitor.

The thickness (t1) may be one of an average thickness, a maximum thickness, and a thickness measured in the center, of the conductive polymer layer 130.

For example, the thickness (t1) may be determined by defining a predetermined number (e.g., 5) of points to the left and the predetermined number (e.g., 5) of points to the right from a reference center point of the conductive polymer layer 130 at equal intervals, measuring a thickness of each of the points at equal intervals, and obtaining an average value therefrom, based on an image of a cross-section cut in a central portion of the sintered body 110, scanned by, for example, a scanning electron microscope (SEM). The reference center point may have the same distance, or substantially the same distance in consideration of a measurement error, from two edge portions of the conductive polymer layer 130. In this case, the thickness (t1) may be an average thickness of the conductive polymer layer 130.

Alternatively, the thickness (t1) may be determined by defining a predetermined number (e.g., 5) of points to the left and the predetermined number (e.g., 5) of points to the right from a reference center point of the conductive polymer layer 130 at equal intervals, measuring a thickness of each of the points at equal intervals, and obtaining a maximum value therefrom, based on an image of a cross-section cut in a central portion of the sintered body 110, scanned by, for example, a scanning electron microscope (SEM). In this case, the thickness (t1) may be a maximum thickness of the conductive polymer layer 130.

Alternatively, the thickness (t1) may be a thickness of a reference center point of the conductive polymer layer 130, based on an image of a cross-section cut in a central portion of the sintered body 110, scanned by, for example, a scanning electron microscope (SEM). The reference center point may have the same distance, or substantially the same distance in consideration of a measurement error, from two edge portions of the conductive polymer layer 130. The thickness (t2) may be an average thickness or a maximum thickness of the conductive polymer layer 130 in an edge portion.

For example, the thickness (t2) may be an average of thicknesses of four edge portions of the conductive polymer layer 130, based on an image (or images) of a cross-section cut in a central portion of the sintered body 110, scanned by, for example, a scanning electron microscope (SEM).

Alternatively, the thickness (t2) may be a maximum thickness among thicknesses of four edge portions of the conductive polymer layer 130, based on an image (or images) of a cross-section cut in a central portion of the sintered body 110, scanned by, for example, a scanning electron microscope (SEM).

The ratio (t2/t1) of the thickness (t2) of the conductive polymer layer 130 in the edge portion of the sintered body 110 to the thickness (t1) of the conductive polymer layer 130 in the central portion of the sintered body 110 may be adjusted to satisfy $0.35 \leq t2/t1 \leq 0.9$, so that even when the same amount of a polymer slurry 131 is applied, since the thickness of the edge portion can be formed to be thicker than in the prior art, thermal stability due to external impact can be increased, and reliability can be improved under less influence of moisture.

When the ratio (t2/t1) of the thickness (t2) of the conductive polymer layer 130 in the edge portion of the sintered body 110 to the thickness (t1) of the conductive polymer layer 130 in the central portion of the sintered body 110 is less than 0.35, the thickness (t2) of the conductive polymer layer 130 in the edge portion of the sintered body 110 may be too thin, so that a moisture resistance defect may occur, and there is also a problem in heat resistance, making it difficult to implement a high pressure product.

When the ratio (t2/t1) of the thickness (t2) of the conductive polymer layer 130 in the edge portion of the sintered body 110 to the thickness (t1) of the conductive polymer layer 130 in the central portion of the sintered body 110 exceeds 0.9, it is difficult to implement a high capacity and small solid electrolyte capacitor.

According to an embodiment of the present disclosure, the thickness (t2) of the conductive polymer layer 130 in the edge portion of the sintered body 110 may be 3 to 20 µm.

Since the thickness of the edge portion of the sintered body 110 can be made to be thicker than the thickness in the prior art, the thickness (t2) of the conductive polymer layer 130 in the edge portion of the sintered body 110 may satisfy 3 to 20 µm, the thickness of the conductive polymer layer 130 disposed above the sintered body 110 may be uniform for each location.

Due thereto, it is possible to increase thermal stability due to external impacts, and reliability can be improved by being less affected by moisture.

When the thickness (t2) of the conductive polymer layer 130 in the edge portion of the sintered body 110 is less than 3 µm, the thickness (t2) of the conductive polymer layer 130 in the edge portion of the sintered body 110 is thin, such that thermal stability may be deteriorated due to external impacts and moisture resistance defects may occur.

When the thickness (t2) of the conductive polymer layer 130 in the edge portion of the sintered body 110 exceeds 20 µm, the thickness (t2) of the conductive polymer layer 130 in the edge portion of the sintered body 110 may be too thick, such that it may be difficult to implement a small tantalum capacitor.

According to an embodiment of the present disclosure, a polymer slurry 131 for forming the conductive polymer layer 130 further includes conductive particles 132 to adjust the ratio (t2/t1) of the thickness (t2) of the conductive polymer layer 130 in the edge portion of the sintered body 110 to the thickness (t1) of the conductive polymer layer 130 in the central portion of the sintered body 110 to satisfy $0.35 \leq t2/t1 \leq 0.9$.

Specifically, the polymer slurry 131 for forming the conductive polymer layer 130 is a conductive polymer for forming the cathode layer, and may include polypyrrole, EDOT (3,4-ethylenedioxythiophene), or polyaniline.

When the conductive polymer layer 130 includes polypyrrole, a cathode having a conductive polymer cathode may be formed on an outer surface of the sintered body 110 formed with an insulating layer using a method of electrolytic polymerization using a pyrrole monomer.

When the conductive polymer layer 130 includes EDOT (3,4-ethylenedioxythiophene), a cathode having a conductive polymer cathode may be formed on an outer surface of the sintered body 110 formed with an insulating layer using a method of chemical polymerization using EDOT (3,4-ethylenedioxythiophene).

According to an embodiment of the present disclosure, the conductive polymer layer 130 is a conductive polymer, in addition to polypyrrole, EDOT (3,4-ethylenedioxythiophene) or polyaniline, the conductive polymer layer 130 may include any one or more of conductive particles 132 of graphene, carbon nanotubes, and carbon black.

The conductive polymer layer 130 may include any one or more of the conductive particles 132 of graphene, carbon nanotubes, and carbon black, so that it can be adjusted that the ratio (t2/t1) of the thickness (t2) of the conductive polymer layer 130 in the edge portion of the sintered body 110 to the thickness (t1) of the conductive polymer layer 130 in the central portion of the sintered body 110 to satisfy $0.35 \leq t2/t1 \leq 0.9$.

Specifically, in a process of forming the conductive polymer layer 130 above the sintered body 110, any one or more conductive particles 132 of the graphene, carbon nanotubes and carbon black may induce a coffee ring effect.

As shown in FIG. 4, the polymer slurry 131 containing any one or more conductive particles 132 of the graphene, carbon nanotubes and carbon black starts evaporating from the edge surface of the sintered body 110, particle density of a place to be evaporated first is increased, and thus the surrounding slurry and particles are further pulled due to the increased particle density and high solid content, thereby increasing the thickness of the edge portion of the sintered body 110. In one example, a density of conductive particles 132 in the edge portion of the conductive polymer layer 130 may be greater than a density of conductive particles 132 in the other portion of the conductive polymer layer 130, for example, a central portion of the conductive polymer layer 130. For example, a density of conductive particles 132 in the edge portion of the conductive polymer layer 130 which has the thickness (t2) may be greater than a density of conductive particles 132 in the central portion of the conductive polymer layer 130 which has the thickness (t1). Here, a density of conductive particles 132 may refer to the number of conductive particles 132 in one unit volume of the conductive polymer layer 130 or a density of conductive particles 132 may refer to the number of conductive particles 132 in one unit area of the conductive polymer layer 130 in a cross-sectional cut, although the definition of the density of conductive particles 132 is not limited thereto.

In addition, according to an embodiment of the present disclosure, the conductive polymer layer 130 may include any one or more conductive particles 132 of graphene, carbon nanotubes, and carbon black, thereby selectively selecting particles having different conductivity, such that an equivalent series resistance (ESR) of the tantalum capacitor can be adjusted to a desired level.

Particularly, according to an embodiment of the present disclosure, the conductive polymer layer 130 may include carbon black, thereby increasing the thickness of the edge portion of the sintered body 110, such that thermal stability due to external impacts may be increased, and reliability can be improved by being less affected by moisture.

According to an embodiment of the present disclosure, the conductive polymer layer 130 is a conductive polymer, in addition to polypyrrole, EDOT (3,4-ethylenedioxythiophene) or polyaniline, and the conductive polymer layer 130 may include any one or more conductive particles 132 of graphene, carbon nanotubes and carbon black, and may further include any one or more metal oxides of $BaTiO_3$, $Al_2O_3$, $SiO_2$ and $ZrO_2$.

The conductive polymer layer 130 may further include any one or more metal oxides of $BaTiO_3$, $Al_2O_3$, $SiO_2$ and $ZrO_2$ in addition to a conductive polymer and any one or more conductive particles 132 of graphene, carbon nanotubes, and carbon black, such that the reliability of the solid electrolyte capacitor may be improved.

The conductive polymer layer 130 may include the conductive particles 132 in an amount more than 0 wt % to 50 wt % or less compared to 100 wt % of the polymer solid content.

The conductive polymer layer 130 may include the conductive particles 132 in an amount more than 0 wt % to 50 wt % or less compared to 100 wt % of the polymer solid content, such that thermal stability due to external impacts may be increased, and reliability can be improved by being less affected by moisture.

When the conductive polymer layer 130 includes the conductive particles 132 in an amount more than 50 wt %, compared to 100 wt % of the polymer solid content, there may be a problem that the equivalent series resistance (ESR) of the tantalum capacitor increases.

More preferably, the conductive polymer layer 130 may include the conductive particles 132 in an amount of 5 wt % or more and 25 wt % or less compared to 100 wt % of the polymer solid content.

The conductive polymer layer 130 may include the conductive particles 132 in a content of 5 wt % or more and 25 wt % or less, compared to 100 wt % of the polymer solid content, such that an effect of improving thermal stability due to external impacts and improving reliability due to prevention of moisture penetration may be more excellent.

When the conductive polymer layer 130 includes the conductive particles 132 in an amount of less than 5 wt %, compared to 100 wt % of the polymer solid content, the effect of increasing the thickness of the edge portion of the sintered body 110 is insufficient, so the effect of improving thermal stability and reliability is not large.

When the conductive polymer layer 130 contains the conductive particles 132 in excess of 25 wt %, compared to 100 wt % of the polymer solid content, there may be a problem that an equivalent series resistance (ESR) of the tantalum capacitor increases.

A weight percentage of the conductive particles 132 may be measured by weighing the conductive particles after separating the conductive particles 132 from the conductive polymer layer 130. In one example, a first weight of the conductive polymer layer 130 of the tantalum capacitor (or a first weight of a predetermined number (e.g. 100) of the tantalum capacitors) may be measured, and then, a second weight of the conductive particles 132 of the tantalum capacitor (or a second weight of the conductive polymer layers 130a of the predetermined number (e.g. 100) of the tantalum capacitors) may be measured by after separating the conductive particles 132 from the conductive polymer layer 130. In this case, the weight percentage of the conductive particles 132 may be determined by calculating the ratio of the second weight to (the first weight minus the second weight).

Next, a carbon layer 140 is stacked on the conductive polymer layer 130, and is stacked such a manner that carbon powder is dissolved in an organic solvent containing an epoxy-based resin, to impregnate the sintered body 110 in a solution in which the carbon powder is dissolved, followed by drying at a predetermined temperature to volatilize the organic solvent.

In addition, the carbon layer 140 may serve to prevent silver (Ag) ions from passing therethrough.

Next, an upper surface of the carbon layer 140 may include a silver (Ag) layer 150 formed of a silver (Ag) paste.

The silver (Ag) layer 150 may be stacked on the outside of the carbon layer 140 to improve conductivity.

In addition, the silver (Ag) layer 150 may improve conductivity for polarity of the cathode layer, thereby facilitating electrical connection for polarity transfer.

A fabrication method of a solid electrolyte capacitor according to another embodiment of the present disclosure includes operations of: forming a sintered body by sintering; and forming a conductive polymer layer above the sintered body, wherein a ratio (t2/t1) of a thickness (t2) of the conductive polymer layer in an edge portion of the sintered body to a thickness (t1) of the conductive polymer layer in a central portion of the sintered body satisfies $0.35 \leq t2/t1 \leq 0.9$.

In a method of fabricating the solid electrolyte capacitor, first, a sintered body is formed by sintering.

In the method of forming the sintered body, the sintered body 110 is molded such that the anode wire 120 is disposed to be offset therefrom. In more detail, for example, the tantalum powder and the binder are mixed and stirred at a certain ratio, the mixed powder is compressed into a cuboid form, and then sintered under high temperature and high vibrations to form the sintered body 110.

Meanwhile, the anode wire 120 is inserted into and mounted thereon to be offset from the center of the sintered body 110 before compressing the mixed powder, and such that one end portion thereof protrudes to the outside. Thereafter, an insulating layer and a conductive polymer layer 130, which is a cathode layer, are formed on the sintered body 110.

In the operation of forming the conductive polymer layer 130, according to another embodiment of the present disclosure, as a conductive polymer, a polymer slurry 131 in which a polymer is dispersed in an aqueous phase, by including any one or more conductive particles 132 of graphene, carbon nanotubes, and carbon black is prepared in a polymer slurry containing polypyrrole, EDOT (3,4-ethylenedioxythiophene) or polyaniline.

In this case, any one or more conductive particles of the graphene, carbon nanotubes, and carbon black may be present in a solid form that is not dissolved in an aqueous phase.

The conductive polymer layer 130 may be formed by applying the polymer slurry 131 above the sintered body 110.

In particular, according to an embodiment of the present disclosure, the conductive polymer layer 130 may include carbon black, thereby increasing the thickness of the edge portion of the sintered body 110. Thus, it is possible to increase thermal stability due to external impact, and reliability can be improved by being less affected by moisture.

In addition, in order to improve reliability of the solid electrolyte capacitor of the present disclosure, in addition to polypyrrole, EDOT (3,4-ethylenedioxythiophene), or polyaniline, one or more conductive particles of graphene, carbon nanotubes and carbon black, any one or more metal oxides of $BaTiO_3$, $Al_2O_3$, $SiO_2$ and $ZrO_2$ may further be included.

The carbon layer 140 and the silver (Ag) layer 150 may be sequentially stacked on the chip body 110 on which the conductive polymer layer 130, which is the cathode layer, is formed, so that the conductivity of the polarity of the cathode layer is improved.

Other features are the same as the description of the solid electrolytic capacitor according to an embodiment of the present disclosure described above, so a detailed description thereof will be omitted.

As set forth above, according to the present disclosure, a conductive polymer layer of a solid electrolyte capacitor may include conductive particles in addition to polymer solids, and adjust the type and concentration of the conductive particles, thereby increasing conductivity.

In addition, by adjusting the type and concentration of the conductive particles, it is possible to adjust the ratio of the thickness of the conductive polymer layer in the edge portion to the thickness of the conductive polymer layer in the central portion of the sintered body, thereby implementing a solid electrolyte capacitor having high reliability.

In addition, even when the same amount of a polymer slurry is applied, since the thickness of the edge portion can be formed to be thicker than in the prior art, thermal stability due to external impact can be increased, and reliability can be improved under less influence of moisture.

However, various and advantageous advantages and effects of the present invention are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A solid electrolyte capacitor, comprising:
    a body containing metal;
    an anode electrode extending from an interior of the body through a first surface of the body;
    a dielectric oxide layer disposed on the body;
    a conductive polymer layer disposed on the dielectric oxide layer and extending from a second surface of the body onto the first surface; and
    a carbon layer disposed on the conductive polymer layer and the first surface of the body,
    wherein a ratio (t2/t1) of a thickness (t2) of the conductive polymer layer in an edge portion of the body to a thickness (t1) of the conductive polymer layer in a central portion of the body satisfies $0.35 \leq t2/t1 \leq 0.9$,
    wherein the conductive polymer layer comprises one or more conductive particles of graphene, carbon nanotubes, or carbon black, and
    wherein the thickness (t2) of the conductive polymer layer in the edge portion of the body is 3 to 20 µm.

2. The solid electrolyte capacitor of claim 1, wherein the conductive polymer layer comprises polypyrrole, EDOT (3,4-ethylenedioxythiophene), or polyaniline.

3. The solid electrolyte capacitor of claim 1, wherein the conductive polymer layer comprises the conductive particles in an amount of 5 wt % or more and 25 wt % or less, compared to 100 wt % of a polymer solid content of the conductive polymer layer.

4. The solid electrolyte capacitor of claim 1, wherein the conductive polymer layer comprises one or more metal oxides of $BaTiO_3$, $Al_2O_3$, $SiO_2$ or $ZrO_2$.

5. The solid electrolyte capacitor of claim 1, wherein the metal includes one or more selected from a group consisting of tantalum (Ta), aluminum (Al), niobium (Nb), vanadium (V), titanium (Ti), and zirconium (Zr).

6. The solid electrolyte capacitor of claim 1, further comprising a silver (Ag) layer disposed on the carbon layer.

7. A fabrication method of a solid electrolyte capacitor, comprising operations of:
    forming a body by sintering a molded body containing metal powder;
    forming an anode electrode extending from an interior of the body through a first surface of the body;
    forming a dielectric oxide layer on the body;
    forming a conductive polymer layer on the dielectric oxide layer; and
    forming a carbon layer on the conductive polymer layer and the first surface of the body,
    wherein the conductive polymer layer has a ratio (t2/t1) of a thickness (t2) of the conductive polymer layer in an edge portion of the body to a thickness (t1) of the conductive polymer layer in a central portion of the body satisfying $0.35 \leq t2/t1 \leq 0.9$,
    wherein the conductive polymer layer comprises one or more conductive particles of graphene, carbon nanotubes or carbon black, and
    wherein the thickness (t2) of the conductive polymer layer in the edge portion of the body is 3 to 20 µm.

8. The fabrication method of the solid electrolyte capacitor of claim 7, wherein the conductive polymer layer comprises polypyrrole, EDOT (3,4-ethylenedioxythiophene), or polyaniline.

9. The fabrication method of the solid electrolyte capacitor of claim 7, wherein the conductive polymer layer comprises the conductive particles in an amount of 5 wt % or more and 25 wt % or less, compared to 100 wt % of a polymer solid content of the conductive polymer layer.

10. The fabrication method of the solid electrolyte capacitor of claim 7, wherein the conductive polymer layer comprises one or more metal oxides of $BaTiO_3$, $Al_2O_3$, $SiO_2$, or $ZrO_2$.

11. The fabrication method of the solid electrolyte capacitor of claim 7, wherein the metal powder is one or more selected from a group consisting of tantalum (Ta), aluminum (Al), niobium (Nb), vanadium (V), titanium (Ti), and zirconium (Zr).

12. The fabrication method of the solid electrolyte capacitor of claim 7, further comprising an operation of:
forming a silver (Ag) layer on the carbon layer.

13. A solid electrolyte capacitor, comprising:
a body containing metal;
a conductive polymer layer disposed on the body; and
an anode electrode extending from an interior of the body to an exterior of the conductive polymer,
wherein a density of conductive particles contained in the conductive polymer layer in an edge portion of the conductive polymer layer is greater than a density of conductive particles contained in the conductive polymer layer in a central portion of the conductive polymer layer.

14. The solid electrolyte capacitor of claim 13, wherein the conductive particles contained in the conductive polymer layer comprise one or more conductive particles of graphene, carbon nanotubes, or carbon black.

15. The solid electrolyte capacitor of claim 14, wherein the conductive polymer layer comprises the conductive particles in an amount of 5 wt % or more and 25 wt % or less, compared to 100 wt % of a polymer solid content of the conductive polymer layer.

16. The solid electrolyte capacitor of claim 13, wherein the metal includes one or more selected from a group consisting of tantalum (Ta), aluminum (Al), niobium (Nb), vanadium (V), titanium (Ti), and zirconium (Zr), and
the solid electrolyte capacitor further comprising:
a carbon layer disposed on the conductive polymer layer; and
a silver (Ag) layer disposed on the carbon layer.

\* \* \* \* \*